（12） United States Patent  
Mochizuki et al.

(10) Patent No.: US 8,248,893 B2  
(45) Date of Patent: Aug. 21, 2012

(54) ENERGY-ASSISTED MAGNETIC-RECORDING HEAD HAVING A MAGNETIC-RECORDING ASSISTANCE ELEMENT DISPOSED TO LOWER MAGNETIC-RECORDING FIELD FOR REVERSING MAGNETIZATION IN A MAGNETIC-RECORDING DISK

(75) Inventors: Masafumi Mochizuki, Kanagawa (JP); Hiroyasu Tanabe, Kanagawa (JP); Hideki Zaitsu, Kanagawa (JP); Hideaki Maeda, Kanagawa (JP)

(73) Assignee: Hitachi Global Storage Tecnologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/573,069

(22) Filed: Oct. 2, 2009

(65) Prior Publication Data

US 2011/0096638 A1  Apr. 28, 2011

(30) Foreign Application Priority Data

Oct. 3, 2008 (JP) .................................. 2008-258533

(51) Int. Cl.
*G11B 11/00* (2006.01)
(52) U.S. Cl. .................................. 369/13.33; 369/13.13
(58) Field of Classification Search ............... 369/13.33, 369/13.13, 13.32, 13.02, 112.09, 112.14, 369/112.21, 112.27; 360/59; 385/129, 31, 385/88–94; 250/201.3, 201.5

See application file for complete search history.

(56) References Cited

U.S. PATENT DOCUMENTS

| | | | |
|---|---|---|---|
| 6,785,092 B2 | 8/2004 | Covington et al. | |
| 7,206,166 B2 | 4/2007 | Notsuke et al. | |
| 2007/0096854 A1 | 5/2007 | Matsumoto et al. | |
| 2007/0177302 A1 | 8/2007 | Shimazawa et al. | |
| 2007/0188921 A1* | 8/2007 | Mochizuki et al. | 360/126 |
| 2007/0211382 A1* | 9/2007 | Mochizuki et al. | 360/126 |
| 2007/0253107 A1* | 11/2007 | Mochizuki et al. | 360/126 |
| 2009/0154021 A1* | 6/2009 | Nunokawa et al. | 360/59 |

FOREIGN PATENT DOCUMENTS

JP  2008-010026  1/2008

* cited by examiner

*Primary Examiner* — Tan X Dinh

(57) ABSTRACT

A head-slider configured to fly in proximity to a recording surface of a magnetic-recording disk. The head-slider includes a write element including a main pole configured to generate a magnetic-recording field from a pole tip of the main pole in a first localized portion of the magnetic-recording disk. The head-slider also includes a magnetic-recording assistance element configured to provide energy to a second localized portion of the magnetic-recording disk in order to increase reversibility of a magnetization in a first localized portion of the magnetic-recording disk. A width of the pole tip of the main pole on a leading-edge side is wider than a width of the pole tip of the main pole on a trailing-edge side.

16 Claims, 8 Drawing Sheets

ENERGY-ASSISTED MAGNETIC-RECORDING HEAD HAVING A MAGNETIC-RECORDING ASSISTANCE ELEMENT DISPOSED TO LOWER MAGNETIC-RECORDING FIELD FOR REVERSING MAGNETIZATION IN A MAGNETIC-RECORDING DISK

CROSS-REFERENCE TO RELATED APPLICATION

This application claims priority from the Japanese Patent Application No. 2008-258533, filed Oct. 3, 2008, the disclosure of which is incorporated herein in its entirety by reference.

TECHNICAL FIELD

Embodiments of the present invention relate to a head-slider including a magnetic-recording assistance element, a head-arm assembly (HAA) including the head-slider, and a hard-disk drive (HDD) including the HAA.

BACKGROUND

In recent years, energy-assisted magnetic recording has been proposed as one technique for increasing recording density of a hard-disk drive (HDD). Energy-assisted magnetic recording is a technique in which a magnetic-recording field is applied to a magnetic-recording disk along with near-field light, microwave radiation, or alternative means of magnetic-recording assistance. Also, in recent years, recording density in HDDs has remarkably increased, and correspondingly, the size of the magnetic pole of the magnetic-recording head used in a HDD has been reduced. However, since the magnetic-recording field generated by the magnetic-recording head depends on volume of a magnetic pole that performs the write operation, maintaining the intensity of the magnetic-recording field has become difficult, because the intensity of the magnetic-recording field has decreased along with the reduction in size of the magnetic pole.

As is known in the art, a pole tip of a main pole that generates a magnetic-recording field may be formed with a trapezoidal shape where a width on a leading-edge side (LD side) is narrower than a width on a trailing-edge side (TR side) to prevent recording error on an adjacent track, referred to by the term of art, "side erasure," associated with perpendicular-magnetic-recording (PMR) heads. However, when fabricating the width of the main pole as described above, the volume of the main pole is reduced, so that maintaining the intensity of the magnetic-recording field becomes more difficult. Similarly, maintenance of the magnetic-recording field strength is also an issue for energy-assisted magnetic recording.

SUMMARY

Embodiments of the present invention include a head-slider configured to fly in proximity to a recording surface of a magnetic-recording disk. The head-slider includes a write element including a main pole configured to generate a magnetic-recording field from a pole tip of the main pole in a first localized portion of the magnetic-recording disk. The head-slider also includes a magnetic-recording assistance element configured to provide energy to a second localized portion of the magnetic-recording disk in order to increase reversibility of a magnetization in a first localized portion of the magnetic-recording disk. A width of the pole tip of the main pole on a leading-edge side is wider than a width of the pole tip of the main pole on a trailing-edge side.

DESCRIPTION OF THE DRAWINGS

The accompanying drawings, which are incorporated in and form a part of this specification, illustrate embodiments of the invention and, together with the description, serve to explain the embodiments of the present invention.

Figure 1:
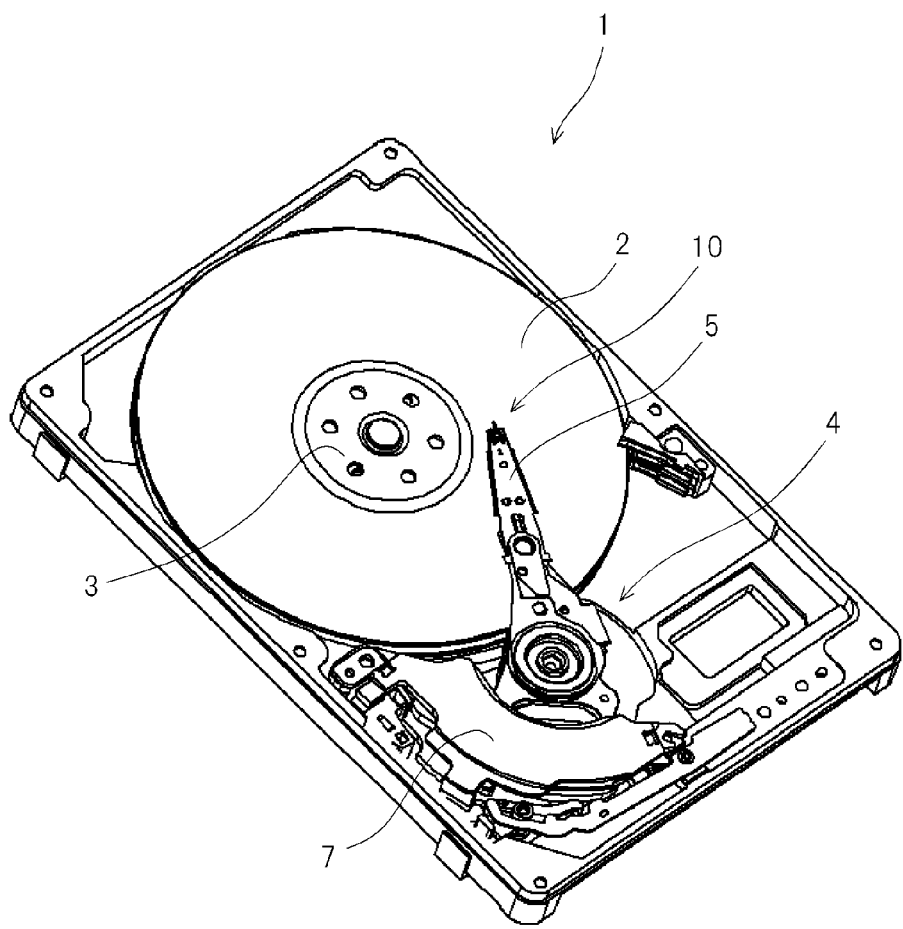
FIG. 1 is a perspective view of an example hard-disk drive (HDD), in accordance with an embodiment of the present invention.

The drawings referred to in this description should not be understood as being drawn to scale except if specifically noted.

Description of Embodiments

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary. Description of Embodiments of the Present Invention for a Head-Slider Including a Magnetic-Recording Assistance Element, a Head-Arm Assembly Including the Head-Slider, and a Hard-Disk Drive Including the Head-Arm Assembly Embodiments of the present invention provide a head-slider, a head-arm assembly (HAA), and a hard-disk drive (HDD) which may suppress the side erasure while maintaining the intensity of the magnetic-recording field. In accordance with embodiments of the present invention, a head-slider is configured to fly in proximity to a recording surface of a magnetic-recording disk, and includes: a write element including a main pole configured to generate a magnetic-recording field from a pole tip of the main pole in a first localized portion of the magnetic-recording disk; and, a magnetic-recording assistance element configured to provide energy to a second localized portion of the magnetic-recording disk in order to increase reversibility of a magnetization in a first localized portion of the magnetic-recording disk. In accordance with embodiments of the present invention, a width of the pole tip of the main pole on a leading-edge side (LD side) is wider than a width of the pole tip of the main pole on a trailing-edge side (TR side). Embodiments of the present invention also provide a HAA including the head-slider. Thus, embodiments of the present invention that apply to the head-slider also apply within the environment of the HAA including the head-slider. Furthermore, embodiments of the present invention provide a HDD including the HAA. Similarly, embodiments of the present invention that apply to the head-slider also apply within the environment of the HDD including the HAA that includes the head-slider.

In one embodiment of the present invention, a width of the pole tip of the main pole widens from the TR side to the LD side.

In another embodiment of the present invention, a width of an end face of the magnetic-recording assistance element is narrower than the width of the pole tip of the main pole In another embodiment of the present invention, the magnetic-recording assistance element is configured to emit near-field light from an end face of the magnetic-recording assistance element.

In another embodiment of the present invention, the magnetic-recording assistance element may include a scatterer made of a metal.

In another embodiment of the present invention, the magnetic-recording assistance element is configured to emit a high frequency magnetic field from an end face of the magnetic-recording assistance element.

In another embodiment of the present invention, an end face of the magnetic-recording assistance element is disposed at the TR side of the pole tip of the main pole.

In another embodiment of the present invention, an end face of the magnetic-recording assistance element is disposed at the LD side of the pole tip of the main pole.

In another embodiment of the present invention, a magnetic shield portion is disposed at least on both sides of the main pole in a cross track direction.

In another embodiment of the present invention, a greatest width of the pole tip of the main pole is greater than a width of a data track written on the magnetic-recording disk.

In accordance with embodiments of the present invention, a HAA includes a head-slider such that the head-slider includes: a write element including a main pole configured to generate a magnetic-recording field from a pole tip of the main pole in a first localized portion of the magnetic-recording disk; and, a magnetic-recording assistance element configured to provide energy to a second localized portion of the magnetic-recording disk in order to increase reversibility of a magnetization in a first localized portion of the magnetic-recording disk. In accordance with embodiments of the present invention, a width of the pole tip of the main pole on a LD side is wider than a width of the pole tip of the main pole on a TR side. In accordance with embodiments of the present invention, the HAA includes the head-slider. Thus, as described herein, embodiments of the present invention that apply to the head-slider also apply within the environment of the HAA including the head-slider.

In accordance with embodiments of the present invention, a HDD includes a head arm assembly such that the HAA includes a head-slider such that the head-slider includes: a write element including a main pole configured to generate a magnetic-recording field from a pole tip of the main pole in a first localized portion of the magnetic-recording disk; and, a magnetic-recording assistance element configured to provide energy to a second localized portion of the magnetic-recording disk in order to increase reversibility of a magnetization in a first localized portion of the magnetic-recording disk. In accordance with embodiments of the present invention, a width of the pole tip of the main pole on a LD side is wider than a width of the pole tip of the main pole on a TR side. In accordance with embodiments of the present invention, a HDD includes the HAA that includes the head-slider. Thus, as described herein, embodiments of the present invention that apply to the head-slider also apply within the environment of the HDD including the HAA that includes the head-slider.

In accordance with embodiments of the present invention, since the main pole includes a pole tip where the LD side width is wider than the TR side width, the volume of the main pole may be increased, so that the intensity of the magnetic-recording field is maintained. Moreover, in accordance with embodiments of the present invention, since the magnetic-recording field generated by the main pole is relatively strong at the TR side and becomes weaker as the distance from the TR side increases, by overlapping a first localized portion of the magnetic-recording disk in which the magnetic-recording field is applied from the TR side with a second localized portion of the magnetic-recording disk in which the reversibility of the magnetization is increased by the magnetic-recording assistance element, a total intensity of the magnetic-recording field required to reverse the magnetization direction is reduced. Thus, in accordance with embodiments of the present invention, the intensity of the magnetic-recording field at a portion of the pole tip separate from the TR side of the pole tip of the main pole may be reduced. Therefore, in accordance with embodiments of the present invention, even if the pole tip of the main pole has a shape where the LD side width is wider than the TR side width, side erasure may be suppressed.

With reference now to FIG. 1, in accordance with an embodiment of the present invention, a perspective view of a HDD 1 is shown. In FIG. 1, the interior of the HDD 1 is shown with a top cover of a disk enclosure (DE) removed. In the base of the DE of the HDD 1, a magnetic-recording disk 2 and a HAA 4 are accommodated. The magnetic-recording disk 2 is attached to a spindle motor (SPM) 3 disposed at a bottom of the DE. HAA 4 is rotatably supported in proximity to a recording surface of the magnetic-recording disk 2. A suspension arm 5 is affixed at a distal end of the HAA 4, and a head-slider 10 is supported at the distal end of the suspension arm 5. A voice coil motor (VCM) 7 is disposed at a rear end of the HAA 4 opposite the distal end where the suspension arm 5 is affixed. VCM 7 rotatably drives the HAA 4 to move the head-slider 10 in an approximately radial direction in proximity to a recording surface of the magnetic-recording disk 2.

Figure 2:
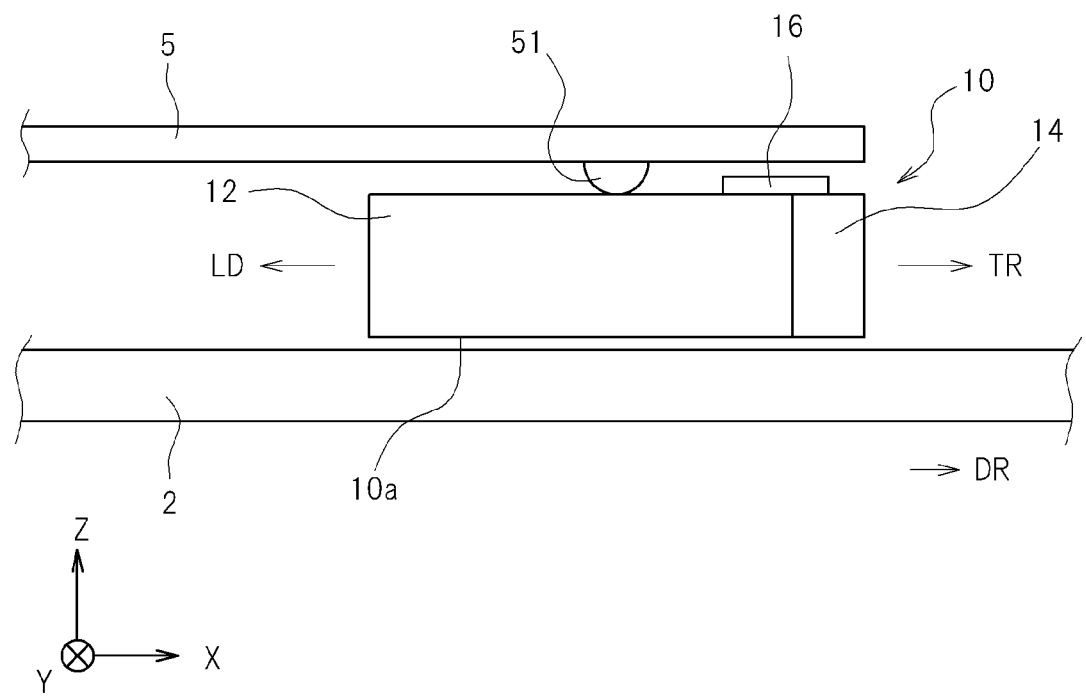
FIG. 2 is a diagram showing a distal end of an example head-arm assembly (HAA), in accordance with an embodiment of the present invention.

With reference now to FIG. 2, in accordance with an embodiment of the present invention, a diagram is shown of the distal end of the HAA 4. In FIG. 2, X, Y, and Z directions respectively represent: a longitudinal direction, a width direction, and a thickness direction of the head-slider 10. The Z direction of the above directions corresponds to a direction perpendicular to the recording surface of the magnetic-recording disk 2 and perpendicular to air-bearing surface (ABS) 10a of the head-slider 10. The X and Y directions substantially correspond respectively to a rotation direction and a radial direction, which lie substantially along a track length direction and a track width direction of a written data track, of the magnetic-recording disk 2. In FIG. 2, arrow DR represents a rotation direction of the magnetic-recording disk 2, arrow TR represents a trailing-edge direction of the head-slider 10, and arrow LD represents a leading-edge direction of the head-slider 10. The head-slider 10 is supported at the distal end of the suspension arm 5 via a dimple 51. The head-slider 10 flies in proximity to the recording surface of the magnetic-recording disk 2 by a wedge film effect of a gas such as air, as the ABS 10a facing the magnetic-recording disk 2 lifts the head-slider 10. The head-slider 10 includes a slider substrate 12, which is a relatively flat solid body made of sintered alumina and titanium carbide (AlTiC) having a rectangular shape. The head-slider 10 also includes a magnetic-recording head 14 formed on the surface at a TR side of the slider substrate 12, which is fabricated using thin-film deposition techniques. A light source 16 such as a laser diode is mounted on a top surface of the head-slider 10, which is the surface facing the suspension arm 5.

Figure 3:
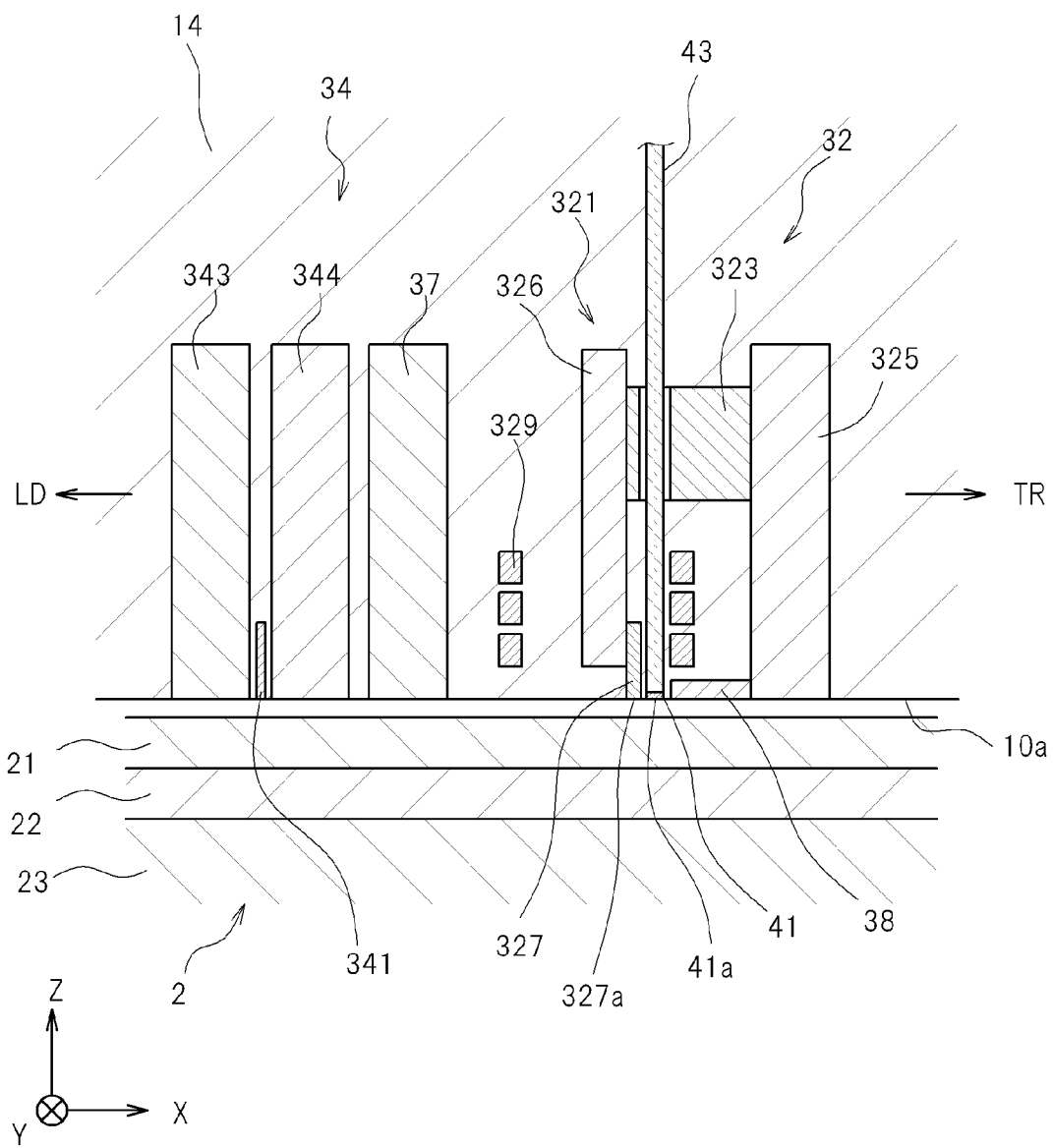
FIG. 3 is a cross-sectional view through a magnetic-recording head of an example head-slider, in accordance with an embodiment of the present invention.
Figure 4:
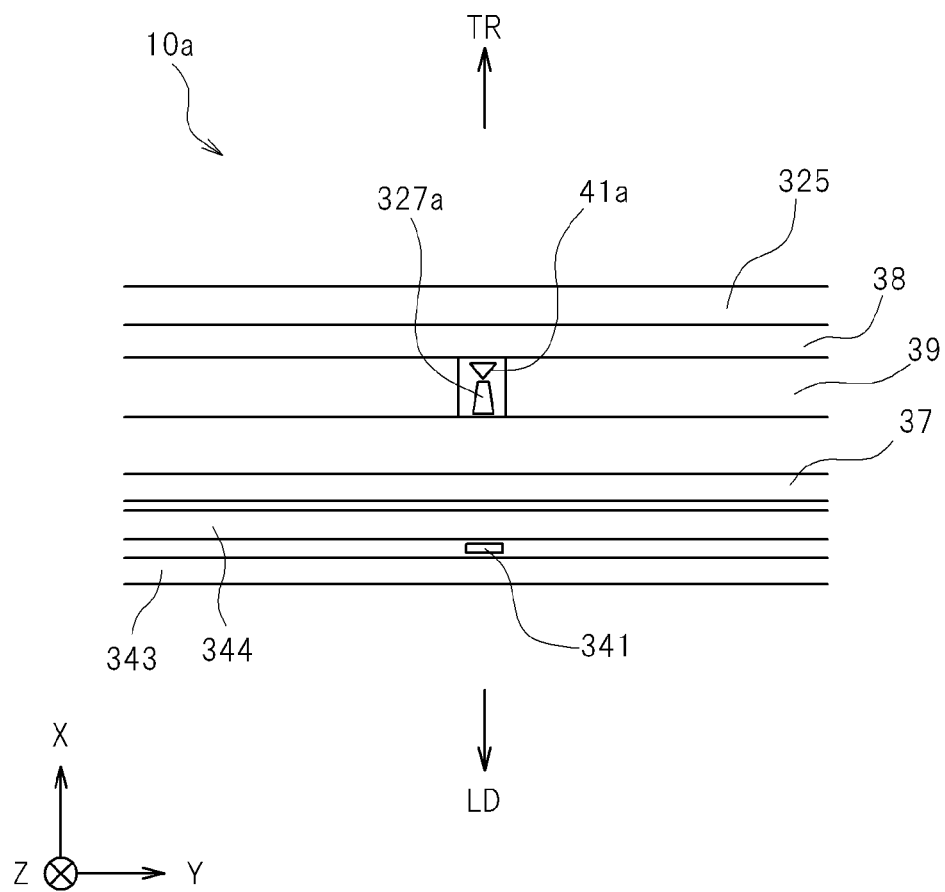
FIG. 4 is a plan view of the magnetic-recording head of the example head-slider of FIG. 3 at an air-bearing surface (ABS), in accordance with an embodiment of the present invention.

With reference now to FIGS. 3 and 4, in accordance with an embodiment of the present invention, a cross-sectional view through the magnetic-recording head 14 of the head-slider 10 is shown in FIG. 3; and, in FIG. 4, a plan view of the head-slider 10 is shown that depicts footprints of the pole tip 327a of the main pole 321 and the end face 41a of the magnetic-recording assistance element 43 of the magnetic-recording head 14 at the ABS 10a. In the magnetic-recording head 14, a write element 32, which includes a probe-pole portion 327 of a main pole 321 as used in perpendicular magnetic recording (PMR), and a read element 34 are arranged with a magnetic shield 37 disposed in between the write element 32 and the read element 34. In the write element 32, a main pole 321 and an auxiliary pole 325 are magnetically connected via a back-gap portion 323. These are made of a soft magnetic material such as Permalloy. In the main pole 321, a probe-pole portion 327 having an elongated shape is attached to a bottom end of a yoke portion 326. The probe-pole portion 327 extends to the ABS 10a, and a pole tip 327a of the probe-pole portion 327 appears on the ABS 10a. The main pole 321 is excited by a coil 329 surrounding the yoke portion 326, and generates a magnetic-recording field that emanates from the probe-pole portion 327. The magnetic-recording field penetrates a magnetic-recording layer 21, an intermediate layer 22 and a soft magnetic underlayer 23 of the magnetic-recording disk 2, and further closes the magnetic circuit by way of the auxiliary magnetic pole 325. The read element 34 includes a read sensor 341 made of a magnetoresistive sensor, and a pair of magnetic shields 343 and 344 between which the read sensor 341 is disposed.

With further reference to FIGS. 3 and 4, in accordance with an embodiment of the present invention, the magnetic-recording head 14 further includes a magnetic-recording assistance element that, in one embodiment of the present invention, includes a near-field optical device 41 emitting near-field light towards the magnetic-recording disk 2, and a waveguide 43 that guides laser light from the light source 16 to the near-field optical device 41. The near-field optical device 41 is arranged adjacent to the probe-pole portion 327 of the main pole 321 on the TR side. Specifically, the near-field optical device 41 includes a scatterer made of a metal such as Au, Ag, Cu, Al, Fe, Ni, or an alloy of these metals, and generates near-field light as the laser light excites a plasmon resonance. The near-field optical device 41 emits the near-field light from an end face 41a of the near-field optical device 41, and provides heat to a second localized portion of the magnetic-recording disk 2, to reduce an anisotropy field at a second localized portion of the magnetic-recording disk 2 and increase reversibility of the magnetization in the first localized portion of the magnetic-recording disk 2.

With further reference to FIGS. 3 and 4, in accordance with an embodiment of the present invention, the magnetic-recording head 14 includes, near the ABS 10a, magnetic shields including magnetic shield portions 38 and 39 that surround a portion of circumferences of the main pole 321 and the near-field optical device 41. The magnetic shield portion 38 of these magnetic shields is placed on the TR side of the near-field optical device 41. The magnetic shield portion 39 is placed on both sides of the main pole 321 and the near-field optical device 41 in a width direction.

Figure 5:
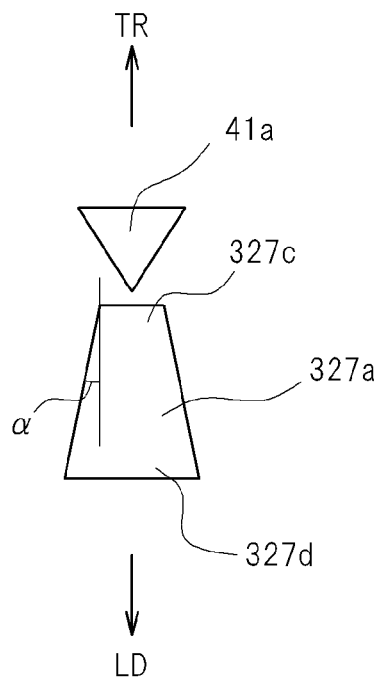
FIG. 5 is an enlarged plan view detailing footprints of a pole tip of a main pole and an end face of a near-field optical device of the magnetic-recording head of the example head-slider of FIG. 3 at the ABS, in accordance with an embodiment of the present invention.

With reference now to FIG. 5, in accordance with an embodiment of the present invention, an enlarged plan view is shown that details footprints of the pole tip 327a of the main pole 321 and the end face 41a of the near-field optical device 41, at the ABS 10a. The pole tip 327a of the main pole 321 has a trapezoidal shape where the width of the LD side 327d is wider than the width of the TR side 327c. The width of the LD side 327d may be wider than the width of the data track formed on the magnetic-recording disk 2, which is the width of the data track written on the magnetic-recording disk 2. The magnetic-recording field generated from the pole tip 327a of the main pole 321 becomes relatively greater at the TR side 327c. The length along the X direction in the width 327a of the main pole 321, which is the height of the trapezoid, is assumed to be, for example, at least two times the width of the TR side 327c. In a more specific example, the length along the X direction is assumed to be 180 nanometers (nm), and a bevel angle α is assumed to be 11 degrees.

With further reference to FIG. 5, in accordance with an embodiment of the present invention, the end face 41a of the near-field optical device 41 is placed on the TR side of the pole tip 327a of the main pole 321, and the width of the end face 41a is narrower than the pole tip 327a of the main pole 321. A second localized portion of the magnetic-recording disk 2 in which near-field light is applied from the end face 41a of the near-field optical device 41 is set to overlap with a first localized portion of the magnetic-recording disk 2 in which the magnetic-recording field is applied from the TR side 327c of the pole tip 327a of the main pole 321. In this example, since the end face 41a of the near-field optical device 41 is near the TR side 327c, overlapping the first and second localized portions of the magnetic-recording disk 2 is easy.

Figure 6:
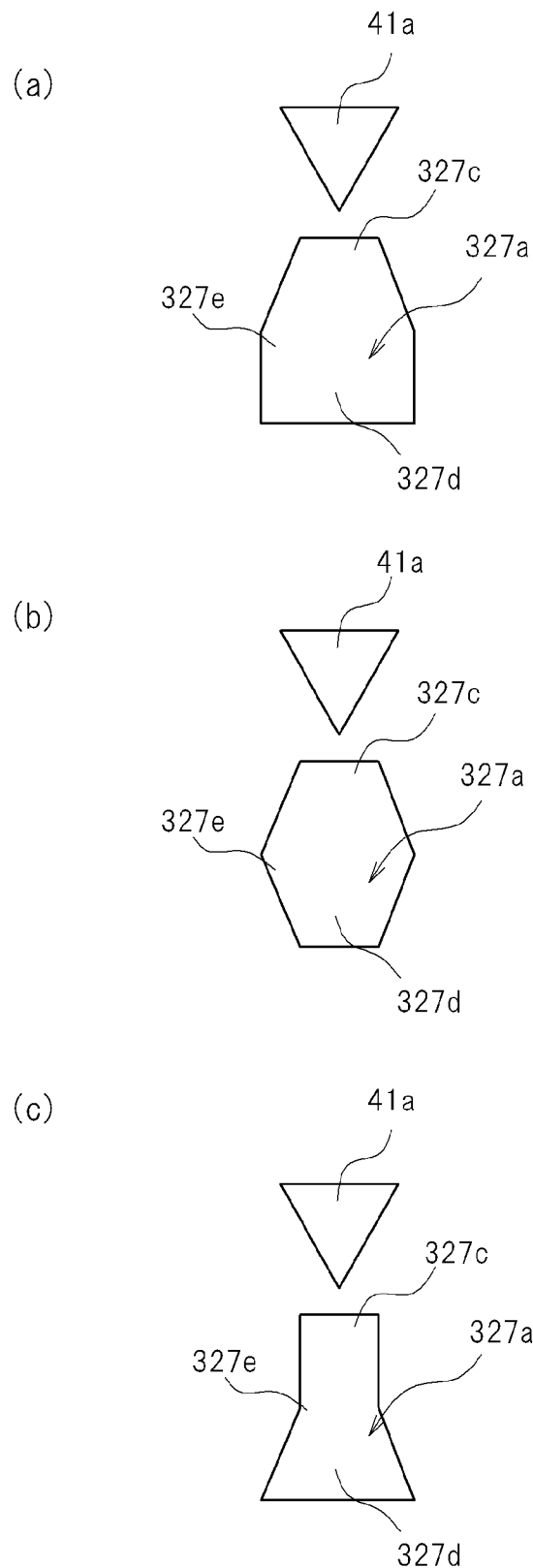
FIGS. 6(a), 6(b) and 6(c) are plan views further depicting modified example shapes of footprints of a pole tip of a main pole and an end face of a near-field optical device at the ABS, in accordance with an embodiment of the present invention.

With reference now to FIGS. 6(a), 6(b) and 6(c), in accordance with an embodiment of the present invention, plan views are shown that further depict modified example shapes of footprints of the pole tip 327a of the main pole 321 and the end face 41a of the near-field optical device 41, at the ABS 10a. As shown in FIG. 6(a), the pole tip 327a of the main pole 321 may be configured to have a shape in which the width gradually widens from the TR side 327c to a middle portion 327e, which is an intermediate portion in the X direction, and thereafter the width is constant from the middle portion 327e to the LD side 327d. As shown in FIG. 6(b), the pole tip 327a of the main pole 321 may be configured to have a shape in which the width gradually widens from the TR side 327c to the middle portion 327e, and thereafter the width gradually narrows from the middle portion 327e to the LD side 327d. As shown in FIG. 6(c), the pole tip 327a of the main pole 321 may be configured to have a shape in which the width is constant from the TR side 327c to the middle portion 327e, and the width gradually widens from the middle portion 327e to the LD side 327d. In the above examples, the sides of the pole tip 327a of the main pole 321 are shown as straight lines, by way of example without limitation thereto, as sides other than the side on the TR side that may be curved lines are within the spirit and scope of embodiments of the present invention.

Figure 7:
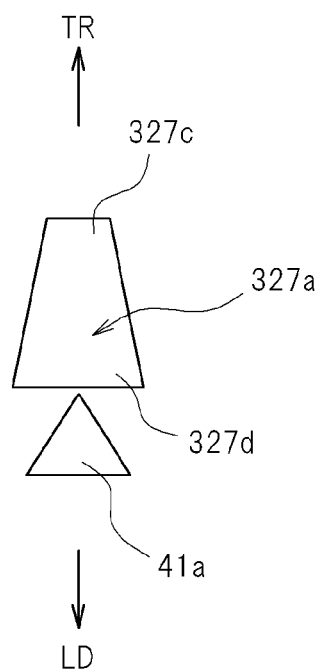
FIG. 7 is an enlarged plan view detailing a modified example arrangement for footprints of a pole tip of a main pole and an end face of a near-field optical device at the ABS, in accordance with an embodiment of the present invention.

With reference now to FIG. 7, in accordance with an embodiment of the present invention, an enlarged plan view is shown that details a modified example arrangement for footprints of the pole tip 327a of the main pole 321 and the end face 41a of the near-field optical device 41, at the ABS 10a. In this modified example, the end face 41a of the near-field optical device 41 is placed on the LD side of the pole tip 327a of the main pole 321. In this case also, a second localized portion of the magnetic-recording disk 2 in which the near-field light is applied from the end face 41a of the near-field optical device 41 is set to overlap with a first localized portion of the magnetic-recording disk 2 in which the magnetic-recording field is applied from the TR side 327c of the pole tip 327a of the main pole 321. Since the pole tip 327a of the main pole 321 has a trapezoidal shape, where the width of the LD side 327d is wider than the width of the TR side 327c, even when the length in the X direction is shortened, a sufficient area may be secured.

Figure 8:
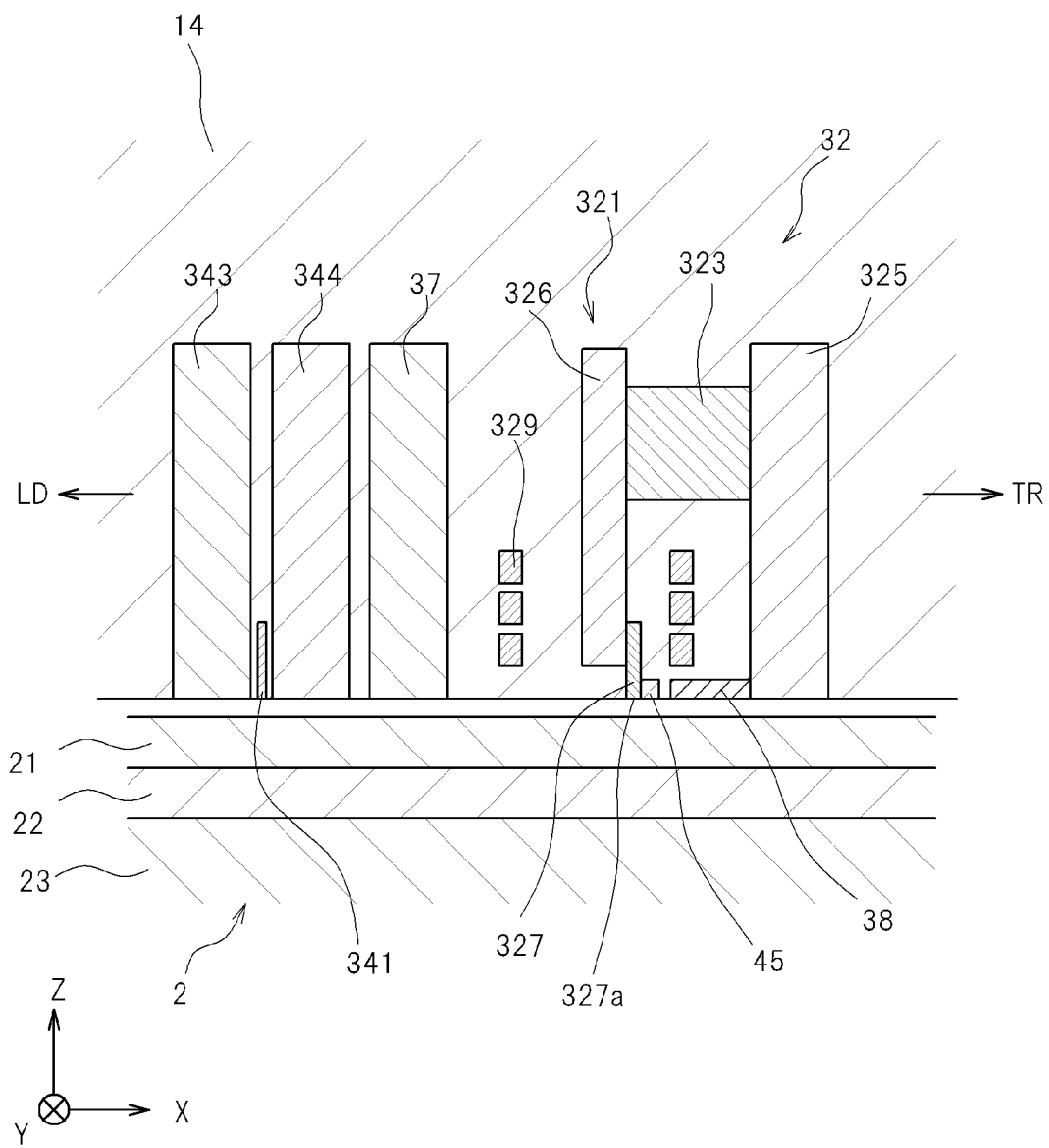
FIG. 8 is a cross-sectional view of a head-slider through a magnetic-recording head depicting an alternative example of a magnetic-recording assistance element disposed in the head-slider, in accordance with an embodiment of the present invention.

With reference now to FIG. 8, in accordance with an embodiment of the present invention, a cross-sectional view of the head-slider 10 through the magnetic-recording head 14 is shown that depicts an alternative example of the magnetic-recording assistance element disposed in the head-slider 10. In this modified example, instead of the near-field optical device 41, the magnetic-recording head 14 includes a magnetic-recording assistance element that includes a microwave generator 45 which operates based on spin torque. The microwave generator 45 is attached adjacent to the pole tip 327a of the probe-pole portion 327 of the main pole 321. The microwave generator 45 locally radiates a microwave towards the magnetic-recording disk 2 to excite magnetic resonance in the second localized portion of the magnetic-recording disk 2 and increase reversibility of magnetization in the first localized portion of the magnetic-recording disk 2.

Figure 9:
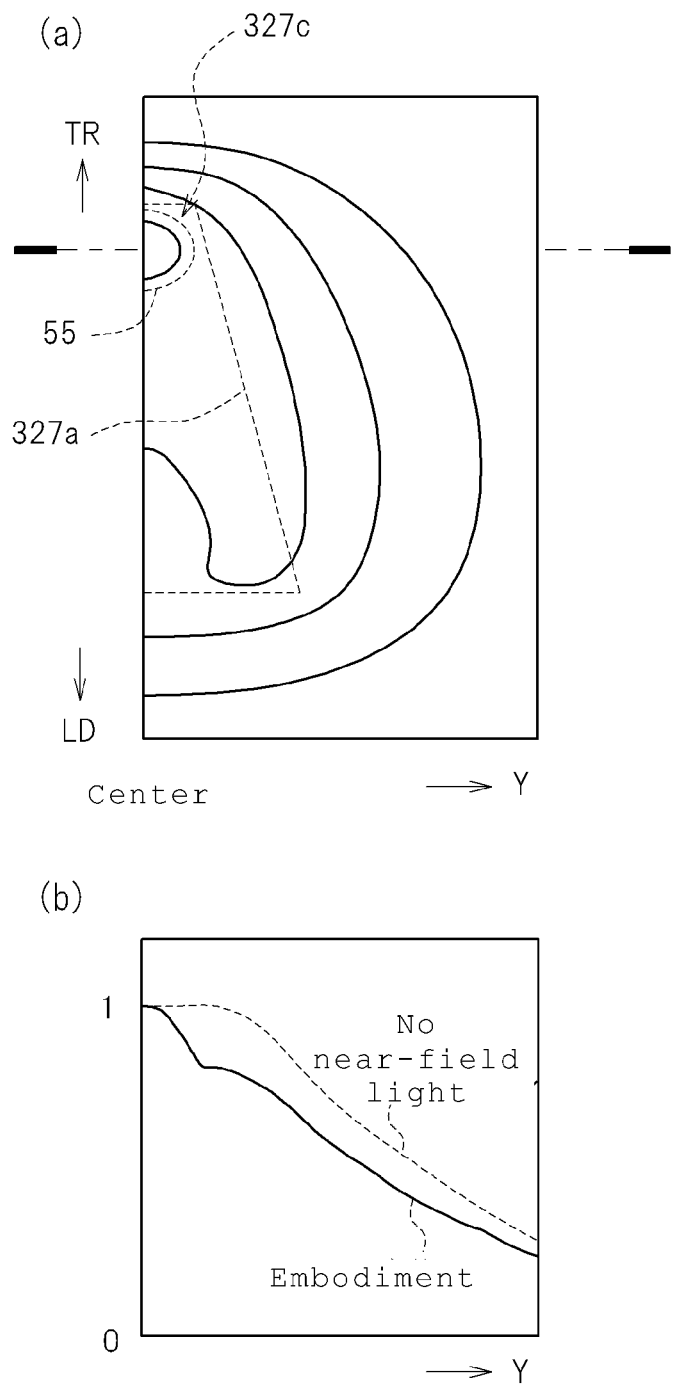
FIG. 9(a) is a magnetic field contour map showing an effective magnetic-recording field resulting from the magnetic-recording assistance element disposed in the head-slider of FIG. 8, in accordance with an embodiment of the present invention.
FIG. 9(b) is a plot of a magnetic field intensity distribution along an alternate long-and-short dashed line of FIG. 9(a), in accordance with an embodiment of the present invention.

With reference now to FIG. 9(a), in accordance with an embodiment of the present invention, a magnetic field contour map is shown of an effective magnetic-recording field in which an amount of reduction of an anisotropy field of the magnetic-recording disk 2 caused by the near-field light from the near-field optical device 41 is added to the magnetic-recording field generated by the main pole 321. In FIG. 9(a), a horizontal axis corresponds to the Y direction, and a vertical axis corresponds to the X direction. In FIG. 9(a), an outline of the pole tip 327a of the main pole 321 and a second localized portion 55 of the magnetic-recording disk 2 in which the near-field light is applied are represented by a dashed line.

With reference now to FIG. 9(b), in accordance with an embodiment of the present invention, a plot is shown of a magnetic field intensity distribution along an alternate long-and-short dashed line of FIG. 9(a). In FIG. 9(b), the horizontal axis corresponds to the horizontal axis of FIG. 9(a). The vertical axis represents a normalized magnetic field intensity normalized by the magnetic intensity at a center in the width direction. The solid line denotes data for this embodiment of the present invention. For comparison, a normalized intensity distribution when the near-field light is not applied is represented by a dashed line.

With further reference to FIGS. 9(a) and 9(b), in accordance with an embodiment of the present invention, portions where an effective magnetic field intensity is relatively high concentrate on the center in the width direction. In this embodiment, since the second localized portion of the magnetic-recording disk 2 in which the near-field light is applied from the near-field optical device 41 is set to overlap with the first localized portion of the magnetic-recording disk 2 in which the magnetic-recording field is applied from the TR side 327c of the pole tip 327a of the main pole 321, a difference between the effective magnetic-recording field intensity at the TR side 327c and the effective magnetic-recording field intensity at the other portions is increased. Therefore, even when the width of the LD side 327d is wider than the width of the data track written on the magnetic-recording disk 2, side erasure may be suppressed. Absent embodiments of the present invention, the magnetic-recording field distribution may be determined by only the magnetic field distribution from the main pole, and the difference between the magnetic-recording field intensity at the TR side and the magnetic-recording field intensity at the other portions may be small, so that a shape of the main pole similar to this embodiment of the present invention cannot be employed. Absent embodiments of the present invention, when a head has a skew angle, a width of the magnetic field in a cross track direction may widen greatly, and application of a larger magnetic field may result.

In accordance with an embodiment of the present invention, conditions for which calculations were performed are next described. The magnetic-recording field generated by the main pole 321 was calculated employing a three-dimensional magnetic field calculation. The thickness of the soft magnetic underlayer 23 was taken to be 30 nm. The thickness of the magnetic shield portions 38 and 39 was taken to be 150 nm. The distance between the probe-pole portion 327 of the main pole 321 and the magnetic shield portion 38 on the TR side of the main pole 321 was taken to be 35 nm. The distance between the probe-pole portion 327 of the main pole 321 and the magnetic shield portion 39 on both sides of the main pole 321 in the width direction was taken to be 120 nm. The width of the TR side 327c of the pole tip 327a of the main pole 321 was taken to be 30 nm. The bevel angle α was taken to be 11 degrees and was set at the pole tip 327a of the main pole 321 to form a trapezoid shape where the width of the LD side 327d is wider than the width of the TR side 327c. The length of the pole tip 327a of the main pole 321 in the X direction was taken to be 180 nm. A material of the probe-pole portion 327 of the main pole 321 was assumed to be CoNiFe, having a saturation magnetic flux density of 2.4 Tesla (T) and a relative magnetic permeability of 500. The yoke portion 326 of the main pole 321 was assumed to be 80 at % Ni-20 at % Fe having a saturation magnetic flux density of 1.0 T. The auxiliary magnetic pole 325 was assumed to be a material having a saturation magnetic flux density of 1.0 T, and also was assumed to have a Y-direction width of 30 micrometers (μm), a Z-direction length of 16 μm, and an X-direction length of 2 μm. The magnetic shields 343 and 344 were assumed to be 80 at % Ni-20 at % Fe having a saturation magnetic flux density of 1.0 T, and also were assumed to have a Y-direction width of 32 μm, a Z-direction length of 16 μm, and an X-direction length of 1.5 μm. A magnetic material of the magnetic shield portions 38 and 39 was assumed to be 45 at % Ni-55 at % Fe having a saturation magnetic flux density of 1.7 T and a relative magnetic permeability of 1000. The number of turns of the coil 329 was taken to be four, and a write current value was assumed to be 35 milliAmperes (mA). A material of the soft magnetic underlayer 23 of the magnetic-recording disk 2 was assumed to have a saturation magnetic flux density of 1.35 T. The thickness of the magnetic-recording layer 21 was taken to be 22 nm. The thickness of the intermediate layer 22 was taken to be 30 nm. The magnetic spacing of the head-slider 10 was assumed to be 10 nm. Therefore, the distance from the head-slider 10 to the underlayer surface 23 may be taken to be 62 nm. The magnetic field was evaluated 20 nm from the ABS into the magnetic-recording disk 2, which corresponds to the center position of the magnetic-recording layer 21. The temperature distribution due to the radiation of the near-field light from the near-field optical device 41 was assumed to have a Gaussian distribution, in which the anisotropy field of the magnetic-recording layer 21 was reduced by 120 Oe/ 10 degrees. The half width of the temperature distribution was assumed to be 30 nm.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A head-slider configured to fly in proximity to a recording surface of a magnetic-recording disk, said head-slider comprising:
   a write element comprising a main pole configured to generate a magnetic-recording field from a pole tip of said main pole in a first localized portion of said magnetic-recording disk; and
   a magnetic-recording assistance element configured to provide energy to a second localized portion of said magnetic-recording disk in order to increase reversibility of a magnetization in a first localized portion of said magnetic-recording disk;
   wherein a width of said pole tip of said main pole on a leading-edge side is wider than a width of said pole tip of said main pole on a trailing-edge side; and
   wherein an end face of said magnetic-recording assistance element is disposed at said trailing-edge side of said pole tip of said main pole.

2. The head-slider of claim 1, wherein said width of said pole tip of Said main pole widens from said trailing-edge side to said leading-edge side.

3. The head-slider of claim 1, wherein a width of said end face of said magnetic-recording assistance element is narrower than said width of said pole tip of said main pole.

4. The head-slider of claim 1, wherein said magnetic-recording assistance element is configured to emit near-field light from said end face of said magnetic-recording assistance element.

5. The head-slider of claim 4, wherein said magnetic-recording assistance element comprises a scatterer made of a metal.

6. The head-slider of claim 1, wherein said magnetic-recording assistance element is configured to emit a high frequency magnetic field from said end face of said magnetic-recording assistance element.

7. The head-slider of claim 1, further comprising:
   a magnetic shield portion disposed at least on both sides of said main pole in a cross track direction.

8. The head-slider of claim 1, wherein a greatest width of said pole tip of said main pole is greater than a width of a data track written on said magnetic-recording disk.

9. A head-arm assembly, comprising:
   a head-slider, said head-slider comprising:
      a write element comprising a main pole configured to generate a magnetic-recording field from a pole tip of said main pole in a first localized portion of said magnetic-recording disk; and
      a magnetic-recording assistance element configured to provide energy to a second localized portion of said magnetic-recording disk in order to increase reversibility of a magnetization in a first localized portion of said magnetic-recording disk;
      wherein a width of said pole tip of said main pole on a leading-edge side is wider than a width of said pole tip of said main pole on a trailing-edge side; and
      wherein an end face of said magnetic-recording assistance element is disposed at said trailing-edge side of said pole tip of said main pole.

10. The head-arm assembly of claim 9, wherein said width of said pole tip of said main pole widens from said trailing-edge side to said leading-edge side.

11. The head-arm assembly of claim 9, wherein a width of said end face of said magnetic-recording assistance element is narrower than said width of said pole tip of said main pole.

12. The head-arm assembly of claim 9, wherein said magnetic-recording assistance element is configured to emit near-field light from said end face of said magnetic-recording assistance element.

13. The head-arm assembly of claim 12, wherein said magnetic-recording assistance element comprises a scatterer made of a metal.

14. The head-arm assembly of claim 9, wherein said magnetic-recording assistance element is configured to emit a high frequency magnetic field from said end face of said magnetic-recording assistance element.

15. The head-arm assembly of claim 9, further comprising:
   a magnetic shield portion disposed at least on both sides of said main pole in a cross track direction.

16. A hard-disk drive, comprising:
   a head arm assembly, said head-arm assembly, comprising:
      a head-slider, said head-slider comprising:
         a write element comprising a main pole configured to generate a magnetic-recording field from a pole tip of said main pole in a first localized portion of said magnetic-recording disk; and
         a magnetic-recording assistance element configured to provide energy to a second localized portion of said magnetic-recording disk in order to increase reversibility of a magnetization in a first localized portion of said magnetic-recording disk;
         wherein a width of said pole tip of said main pole on a leading-edge side is wider than a width of said pole tip of said main pole on a trailing-edge side; and
      wherein an end face of said magnetic-recording assistance element is disposed at said trailing-edge side of said pole tip of said main pole.

* * * * *

UNITED STATES PATENT AND TRADEMARK OFFICE
CERTIFICATE OF CORRECTION

PATENT NO.         : 8,248,893 B2
APPLICATION NO.    : 12/573069
DATED              : August 21, 2012
INVENTOR(S)        : Masafumi Mochizuki et al.

It is certified that error appears in the above-identified patent and that said Letters Patent is hereby corrected as shown below:

Title Page

Assignee: Delete, "Hitachi Global Storage Tecnologies, Netherlands B.V., Amsterdam (NL)"
          Insert, --Hitachi Global Storage Technologies, Netherlands B.V., Amsterdam (NL)--

Column 9, Claim 2, Line 51: Delete, "pole tip of Said main pole widens from said trailing-edge side"
                            Insert, --pole tip of said main pole widens from said trailing-edge side--

Signed and Sealed this
Nineteenth Day of March, 2013

Teresa Stanek Rea
*Acting Director of the United States Patent and Trademark Office*